(12) United States Patent
Kim et al.

(10) Patent No.: US 9,058,028 B2
(45) Date of Patent: Jun. 16, 2015

(54) SYSTEMS AND METHODS FOR PARAMETER DEPENDENT RICCATI EQUATION APPROACHES TO ADAPTIVE CONTROL

(75) Inventors: Kilsoo Kim, Atlanta, GA (US); Tansel Yucelen, Atlanta, GA (US); Anthony J. Calise, Collegeville, PA (US)

(73) Assignee: Georgia Tech Research Corporation, Atlanta, GA (US)

( * ) Notice: Subject to any disclaimer, the term of this patent is extended or adjusted under 35 U.S.C. 154(b) by 561 days.

(21) Appl. No.: 13/460,663

(22) Filed: Apr. 30, 2012

(65) Prior Publication Data

US 2012/0277888 A1 Nov. 1, 2012

Related U.S. Application Data

(60) Provisional application No. 61/480,665, filed on Apr. 29, 2011.

(51) Int. Cl.
| | | |
|---|---|---|
| G05B 13/02 | (2006.01) |
| G06F 17/10 | (2006.01) |
| G06G 7/48 | (2006.01) |
| G06F 15/18 | (2006.01) |
| G06E 3/00 | (2006.01) |
| G06N 7/00 | (2006.01) |

(52) U.S. Cl.
CPC .................................. G05B 13/0205 (2013.01)

(58) Field of Classification Search
CPC .. G05B 13/021; G05B 13/027; G05B 13/041; G05B 13/042; G05B 13/047; G05B 13/048; G05B 2219/41434; G05B 2219/41435; G06N 99/005; H03H 21/0043

USPC ............... 700/28–30, 32, 33, 37, 47, 48, 34; 703/2, 6; 706/14–16, 22, 23, 21, 26, 706/38, 39; 701/1–3
See application file for complete search history.

(56) References Cited

U.S. PATENT DOCUMENTS

| | | | | |
|---|---|---|---|---|
| 4,770,841 | A * | 9/1988 | Haley et al. .................... 376/216 |
| 5,189,618 | A * | 2/1993 | Tsujii et al. ...................... 701/93 |
| 6,366,841 | B1 * | 4/2002 | Ohsaku ............................ 701/37 |
| 6,532,454 | B1 * | 3/2003 | Werbos ............................ 706/14 |
| 6,768,927 | B2 * | 7/2004 | Krogmann ........................ 700/28 |
| 6,823,241 | B2 * | 11/2004 | Shirato et al. ..................... 701/1 |
| 7,039,567 | B2 * | 5/2006 | Nishiyama .......................... 703/2 |
| 7,418,432 | B2 * | 8/2008 | Calise et al. ..................... 706/23 |
| 7,783,368 | B2 * | 8/2010 | Tsai ................................ 700/29 |
| 7,853,364 | B2 * | 12/2010 | Deakins et al. ............... 700/289 |
| 8,185,255 | B2 * | 5/2012 | Lavretsky et al. ................ 701/3 |
| 8,996,195 | B2 * | 3/2015 | Yucelen et al. .................... 701/1 |

* cited by examiner

*Primary Examiner* — Crystal J Barnes-Bullock
(74) *Attorney, Agent, or Firm* — Troutman Sanders LLP; Ryan A. Schneider; Benjamin C. Wiles

(57) ABSTRACT

Systems and methods for adaptive control are disclosed. The systems and methods can control uncertain dynamic systems. The control system can comprise a controller that employs a parameter dependent Riccati equation. The controller can produce a response that causes the state of the system to remain bounded. The control system can control both minimum phase and non-minimum phase systems. The control system can augment an existing, non-adaptive control design without modifying the gains employed in that design. The control system can also avoid the use of high gains in both the observer design and the adaptive control law.

17 Claims, 3 Drawing Sheets

SYSTEMS AND METHODS FOR PARAMETER DEPENDENT RICCATI EQUATION APPROACHES TO ADAPTIVE CONTROL

CROSS-REFERENCE TO RELATED APPLICATIONS AND PRIORITY CLAIM

This Application claims priority under 35 U.S.C. §119(e) to, and the benefit of, U.S. Provisional Patent Application No. 61/480,665, entitled "A Parameter Dependent Riccati Equation Approach to Output Feedback Adaptive Control," filed 29 Apr. 2011. The above-mentioned Application is hereby incorporated by reference as if set forth in its entirety below.

STATEMENT REGARDING FEDERALLY SPONSORED RESEARCH

The present invention was made with United States Government support under contract number NNX08AC61A awarded by NASA. The United States Government has certain rights in the present invention.

BACKGROUND OF THE INVENTION

1. Field of the Invention

Embodiments of the present invention relate to control systems, and particularly, to adaptive control architectures for uncertain dynamic systems.

2. Background of Related Art

An adaptive controller is a controller that makes adjustments, i.e., adaptations, to control an uncertain system. Uncertain systems are systems that can have fixed or time varying parameters with values that are only approximately known. Examples of these parameters include, but are not limited to, aerodynamic coefficients of aircraft, mode shapes of vibrating structures, and parameters associated with dynamics of turbine engines, combustion processes, and chemical reactions. The variations in the parameters may be due to, for example, changes in the operation of a system or process.

Existing adaptive controllers are used to control several types of systems, or "plants," as they are known in the art. They are frequently used, for example and not limitation, to control automobile and aircraft engines and in aircraft flight controls.

Many types of adaptive controllers are known. Some adaptive controllers, for example, attempt to control uncertain systems by employing a state observer. The state observer provides an estimate of the system's internal state using measurements, or sensed quantities, of the uncertain system. The adaptive controller can then adapt to these sensed quantities and provide an output that stabilizes the uncertain system.

Generally, research in adaptive control is motivated by the desire to maintain a specified level of performance in the presence of modeling errors. Performance is usually measured by the reaction speed of a response to an externally generated command, and the ability of the response to accurately track the externally generated command as measured by the difference between the response and the corresponding commanded value. Modeling errors, and therefore decreases in performance, are usually caused by uncertainties associated with dynamic responses of the systems being controlled.

Adaptive controllers can be classified as either state feedback or output feedback. State feedback controllers, for example, can have computationally simpler adaptive control algorithms compared to output feedback algorithms. This can be because, for example, state feedback controllers do not require the use of a state observer. Output feedback adaptive controllers, however, are required for applications in which it is impractical or impossible to sense the entire state of the process or system under control. Examples of such processes or systems include, but are not limited to, active noise suppression, active control of flexible space structures, fluid flow control systems, combustion control processes, control of chemical processes, automotive control systems, flight control of large flexible aircraft and launch vehicles, and low cost or expendable unmanned aerial vehicles. Models for these applications vary from reasonably accurate low frequency models, e.g., in the case of structural control problems, to less accurate low order models, e.g., in the case of active control of noise, vibrations, flows, and combustion processes.

There have been a number of proposed approaches for the design of output feedback adaptive controllers. All of these approaches contain inherent limitations. Some approaches rely on high gain observers, for example, to reconstruct the states of the controlled process that are not available for feedback. High gain approaches, however, are often impractical due to, for example, the amplification of sensor noise and the potential for unstable responses due to unmodeled high frequency dynamics. Other approaches use an output feedback adaptive controller with an error observer instead of a state observer. These approaches are undesirable, however, because they require unnecessarily complex designs and rely on high gains, which can lead to unstable responses.

Recently, one adaptive approach has introduced an adaptive output feedback design that relies on the properties of so-called LQG/LTR controllers that asymptotically satisfy a strictly positive real condition. See E. Lavretsky, "Adaptive Output Feedback Design Using Asymptotic Properties of LQG/LTR controllers," *AIAA Guidance, Navigation, and Control Conference*, Toronto, Canada (2010). This approach minimizes the complexity of the control architecture, but cannot be used to augment an existing controller design and cannot be applied to systems containing non-minimum phase dynamics. This is because, for example, the stability analysis associated with this approach relies on the fact that the designer can set gains at arbitrary high values. It is therefore undesirable in many scenarios.

Many existing adaptive controllers employ a reference model to define the ideal response of the controlled system in the absence of uncertainty. However, the implementation of a reference model can significantly increase the complexity of the architecture of the system. This can be because, for example, the reference model must be programmed into the control system software. In addition, in cases of output feedback, controllers that employ reference models must often employ additional machinery, such as, for example, an error observer.

Incorporating an adaptive controller for uncertain dynamic systems can mean the replacement of, or modification to, an existing control system. It is highly desirable, however, for an adaptive approach to augment an existing controller. Augmentation, as opposed to replacement, can reduce the complexity of the control system and minimize cost. Moreover, designers are often reluctant to modify an existing design. Thus, the incorporation of an adaptive design is more acceptable to designers if it does not require modification of the gains of an existing control system.

It would therefore be desirable to have an adaptive controller that can augment an existing non-adaptive control design without modifying the gains of that design. The controller should be less complex than existing adaptive controllers. The controller should additionally be able to control both minimum phase and non-minimum phase systems and should not require the use of high gains. It is to such a controller that embodiments of the present invention are primarily directed.

SUMMARY OF THE INVENTION

Embodiments of the present invention relate to control systems, and particularly, to adaptive control architectures for uncertain dynamic systems. In some embodiments, the present controller can employ a parameter dependent Riccati equation approach to adaptive control. The controller can employ an adaptive control law that is based at least in part on a weight estimate. The weight estimate, in turn, can be based at least in part on a parameter of a parameter dependent Riccati equation. The value of the parameter can be greater than zero, and can be selected by a designer. However, in a preferred embodiment, for the value or values of the parameter selected by the designer, the parameter dependent Riccati equation has a positive definite solution.

Embodiments of the present invention offer several advantages not provided by existing systems. In some embodiments, for example, the present invention minimizes the complexity of an adaptive control system compared to many existing adaptive control systems. Complexity can be minimized, for example and not limitation, by employing the state observer of an existing, non-adaptive control design without modification to its gains. Moreover, embodiments of the present invention can control both minimum phase and non-minimum phase systems. This is advantageous because, for example, non-minimum phase systems commonly arise when dealing with aircraft longitudinal dynamics, which can be difficult to control.

Embodiments of the present invention also do not necessarily require the use of high gains in the state observer design or in the adaptive control law. Avoiding high gains is desirable because high gains can, for example, amplify sensor noise and increase the potential for unstable responses due to unmodeled high frequency dynamics. Control systems of the present invention can avoid high gains by employing a parameter dependent Riccati equation in the weight estimate of the adaptive control law.

Some embodiments of the present invention also do not necessarily require a reference model. Thus, the architecture of the adaptive output feedback system can be less complex than many other output feedback control systems because a reference model does not need to be programmed into the control system software. Moreover, additional machinery, such as an error observer, is not necessarily required.

Embodiments of the present invention can comprise an adaptive control system for controlling a plant. The adaptive control system can comprise a state observer configured to receive a sensed quantity from the plant. The state observer can be further configured to output a state estimate based at least in part on the sensed quantity. The adaptive control system can further comprise a controller configured to receive the state estimate and employ the state estimate in an adaptive control law to calculate an adaptive control. The adaptive control law can be based at least in part on a weight estimate. The controller can be further configured to produce a control command that is an input to the plant.

In some embodiments, at least a component of the control command can be the adaptive control. In some embodiments, the weight estimate can be based at least in part on a parameter of a parameter dependent Riccati equation. In some embodiments, the value of the parameter of the parameter dependent Riccati equation can be selectable, and the parameter dependent Riccati equation can have a positive definite solution for the selected value of the parameter.

In some embodiments, there can be a maximum value of the parameter of the parameter dependent Riccati equation for which the parameter dependent Riccati equation has a positive definite solution. In some embodiments, the state of the plant can remain bounded when the value of the parameter of the parameter dependent Riccati equation is greater than zero. In some embodiments, the plant can comprise a non-minimum phase system.

In some embodiments, the parameter dependent Riccati equation can be based at least in part on a state observer gain matrix. In some embodiments, the adaptive control system does not comprise a reference model. In some embodiments, the adaptive control law can be based at least in part on a vector of basis functions.

In some embodiments, the control command can further comprise a nominal control from a control system of the plant, and the nominal control can comprise a gain. The adaptive control can augment the nominal control, and the gain of the nominal control is not modified to accommodate the adaptive control.

Embodiments of the present invention can comprise methods for adaptive control of an uncertain system. The methods can comprise providing a first control command as an input to the uncertain system. The first control command can be based at least in part on a first adaptive control. The methods can further comprise receiving a signal by a state observer, and the signal can be based at least in part on a sensed quantity from the uncertain system. The methods can further comprise outputting a state estimate from the state observer, and employing the state estimate in an adaptive control law to calculate a second adaptive control. The adaptive control law can be based at least in part on a weight estimate.

In some embodiments, the methods can further comprise providing a second control command as an input to the uncertain system. The second control command can be based at least in part on the second adaptive control, and the weight estimate can be based at least in part on a parameter of a parameter dependent Riccati equation.

In some embodiments, the methods can further comprise selecting a value of the parameter of the parameter dependent Riccati equation for which the parameter dependent Riccati equation has a positive definite solution. In some embodiments, the methods can further comprise bounding the state of the system. In some embodiments, the uncertain system comprises a non-minimum phase system.

In some embodiments, a reference model is not used to define an ideal response of the uncertain system. In some embodiments, the weight estimate is a function of continuous time, but, in some embodiments, the weight estimate is a function of discrete time. In some embodiments, the second control command comprises the second adaptive control added to a nominal control, and the nominal control comprises a gain. In some embodiments, the gain of the nominal control is not modified to accommodate the adaptive control.

Embodiments of the present invention can comprise an adaptive control system for controlling an uncertain system. The adaptive control system can comprise a reference model configured to output a state estimate. The adaptive control system can further comprise a controller configured to receive the state estimate and employ the state estimate in an adaptive control law to calculate an adaptive control. The adaptive control law can be based at least in part on a weight estimate. The controller can be further configured to produce a control command that is an input to the uncertain system.

In some embodiments, at least a component of the control command can be the adaptive control. In some embodiments, the weight estimate can be based at least in part on a parameter of a parameter dependent Riccati equation. In some embodiments, the value of the parameter of the parameter dependent Riccati equation can be selectable, and the parameter dependent Riccati equation can have a positive definite solution for the selected value of the parameter. In some embodiments, the state of the plant can remain bounded when the value of the parameter of the parameter dependent Riccati equation is greater than zero.

These and other objects, features and advantages of the present invention will become more apparent upon reading the following specification in conjunction with the accompanying drawing figures.

DETAILED DESCRIPTION

Figure 1:
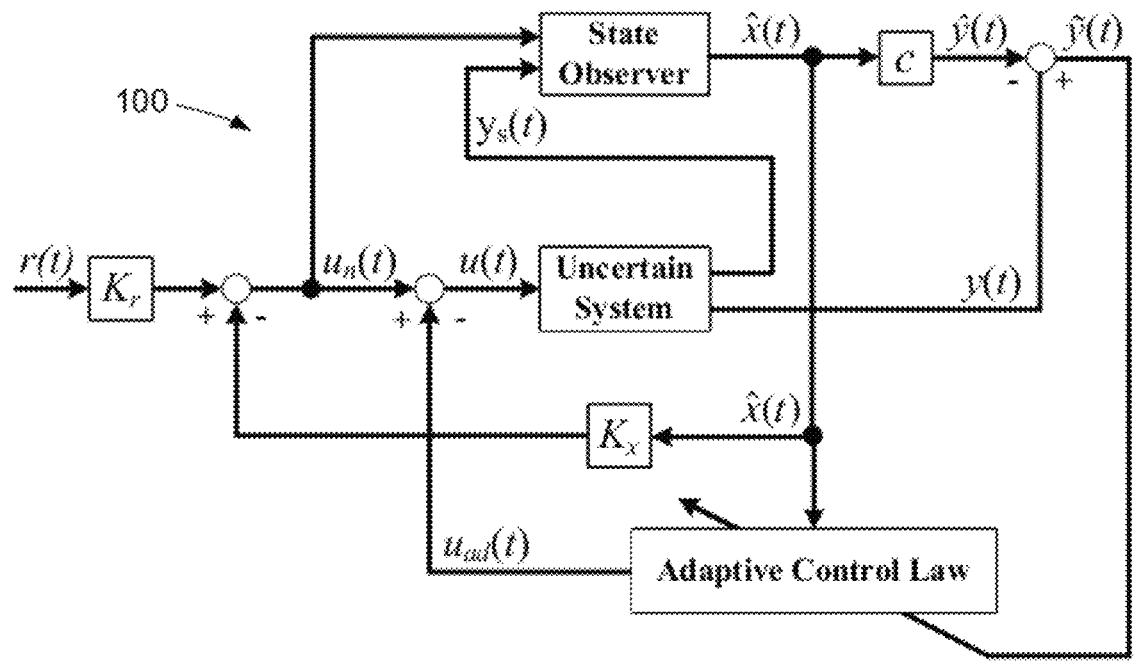
FIG. 1 is a schematic of an adaptive control system, in accordance with some embodiments of the present invention.

Embodiments of the present invention can comprise an adaptive control system for controlling an uncertain system. More specifically, embodiments of the present invention can comprise an output feedback or state feedback adaptive control architecture for continuous time and discrete time systems. In some embodiments, the system can comprise a controller that employs a parameter dependent Riccati equation. The controller can employ an adaptive control law that is based at least in part on a weight estimate. The weight estimate, in turn, can be based at least in part on a parameter dependent Riccati equation. The parameter dependent Riccati equation can have a positive definite solution for certain values of the parameter $\mu$. The value of the parameter can be selected by the designer, and, in preferred embodiments, the value is greater than zero.

In some embodiments, when the parameter is greater than zero and the parameter dependent Riccati equation has a positive definite solution, the controller produces a response that causes the state of the system to remain bounded. The tracking error can also be uniformly ultimately bounded to a sufficiently small error norm. Those of skill in the art will recognize how to determine sufficiently small error norms. Moreover, in systems implemented in discrete time, the tracking error can be uniformly ultimately bounded to a sufficiently small error norm for sufficiently small sample time intervals. Those of skill in the art will also recognize how to determine sufficiently small sample time intervals.

Embodiments of the present invention can control both minimum phase and non-minimum phase systems. The present invention can also augment an existing, non-adaptive control design without modifying the gains employed in the existing design. In some embodiments, controllers of the present invention can avoid the use of high gains in both the observer design and the adaptive control law.

To simplify and clarify explanation, the system is sometimes described herein as an adaptive control system and/or method for controlling an aircraft. One skilled in the art will recognize, however, that the invention is not so limited. The system can also be deployed for other control-related applications, such as, for example and not limitation, controlling an automobile engine or combustion process.

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example. Any dimensions listed in the various drawings are for illustrative purposes only and are not intended to be limiting. Other dimensions and proportions are contemplated and intended to be included within the scope of the invention.

As mentioned above, a problem with existing adaptive controllers is that they cannot augment an existing nominal controller without modification of the existing controller's gains. Existing controllers also cannot control both minimum phase and non-minimum phase systems in an uncomplicated manner. Embodiments of the present invention, however, provide an adaptive control system that can augment a nominal controller without modifying the nominal controller's gains. Embodiments of the present invention also provide a simple control system that can control both minimum phase and non-minimum phase systems.

Embodiments of the present invention can also employ a parameter dependent Riccati equation in the stability analysis to avoid high gain approaches. Aspects of this analysis are detailed in K. Kim, T. Yucelen, & A. J. Calise, "A Parameter Dependent Riccati Equation Approach to Output Feedback Adaptive Control," *AIAA Guidance, Navigation, and Control Conference*, Portland, Oreg. (2011), which is hereby incorporated by reference in its entirety as if fully set forth herein. Employing a parameter dependent Riccati equation in this manner renders embodiments of the present invention able to adaptively control minimum phase and non-minimum phase systems. This is due, at least in part, to the system's ability to avoid high gains.

FIG. 1 illustrates a preferred embodiment of an adaptive control system 100 of the present invention. As shown in FIG. 1, an input to the uncertain system (i.e., the plant) can be a vector control command, u(t). In an aircraft, components of u(t) can represent the control surface deflections, e.g., elevator, aileron, and rudder deflections. In some embodiments, u(t) can represent the signals sent to the electrical or hydraulic actuators that move the control surfaces. As shown in Equation 1 below, u(t) can be the sum of two vector components:

$$u(t) = u_n(t) + u_{ad}(t) \qquad \text{Equation 1:}$$

The first vector component of Equation 1, $u_n(t)$, is the "nominal control." The nominal control can be a portion of an input produced by an existing, non-adaptive control law. In some embodiments, the existing, non-adaptive control law can be produced by an existing on-board control system. This control law can be made up of a feedback gain $K_x$, a feedforward gain $K_r$, and a state observer output. The methods used for designing the non-adaptive control law, including the feedback and feedforward gains, as well as the state observer output, are well known in the art to engineers and designers who practice in the areas of non-adaptive feedback control systems and feedback forms for multiple-input, multiple-output systems. These methods apply equally well to minimum phase and non-minimum phase systems, but are dependent on the model employed to represent the dynamics of the system being controlled. Their performance can therefore degrade if modeling uncertainty is present.

The second vector component of Equation 1, $u_{ad}(t)$, is the "adaptive control." In some embodiments, as shown in Equation 1, the adaptive control is added to the nominal control. The adaptive control can therefore be said to "augment" the nominal control. The adaptive control can be produced by an adaptive control law that relies on a parameter dependent Riccati Equation. As discussed below, the form of the adaptive control law and the methods employed to select the Riccati equation parameter μ (see Equation 10) are objects of the present invention.

As shown in FIG. 1, $y(t)$ can represent the regulated output, and $\hat{y}(t)$ can represent its estimate. The difference between $y(t)$ and $\hat{y}(t)$ can be the error signal, $\tilde{y}(t)$, which can be employed in the adaptive control law described below. If the uncertainty in the system is small, $\tilde{y}(t)$ is small, and the adaptive control can remain close the zero. In such a circumstance, the controller behaves nearly as if the adaptive controller were not present. This means that the behavior will be similar to that of the legacy control design, i.e., the nominal control design without the adaptive controller incorporated. This feature is often highly desirable to a control system designer.

In some embodiments, equations that describe an uncertain system, as shown in FIG. 1, are assumed to have the form of Equations 2a-2c:

$$\dot{x}(t)=Ax(t)+B[u(t)+\Delta(t,x(t))] \quad \text{Equation 2a:}$$

$$y_s(t)=C_s x(t) \quad \text{Equation 2b:}$$

$$y(t)=Cx(t) \quad \text{Equation 2c:}$$

In some embodiments, $\Delta(t,x(t))$ can represent the uncertainty in the system dynamics. This uncertainty can be matched to the control, $u(t)$, so that both the control and the uncertainty can enter the plant dynamics in the same manner, i.e., through input matrix B. The other plant parameter matrices, such as, for example and not limitation, A, $C_s$, and C, can be known and can be used in the design of the nominal control.

In some embodiments, the signal $y_s(t)$ can represent a vector of sensed quantities from the uncertain system that are available for feedback. In some embodiments, the signal $y(t)$ can be a subset of the elements in $y_s(t)$ that can be regulated in such a manner that $y(t)$ closely follows a command vector, $r(t)$. FIG. 1 shows the manner in which the command vector can enter the control system.

In some embodiments, the state observer can be implemented based on the differential equation of Equation 3. In Equation 3, the particular design of the observer can be defined by the observer gain matrix, L.

$$\dot{\hat{x}}(t)=A\hat{x}(t)+Bu_n(t)+L[y_s(t)-C_s\hat{x}(t)] \quad \text{Equation 3:}$$

In some embodiments, it can be assumed that the uncertainty in Equations 2a-2c can be linearly parameterized in the sense that the uncertainty can be represented by Equation 4:

$$\Delta(x(t))=W^T\beta(x)+\epsilon(x), |\beta(x)|\leq\bar{\beta} \quad \text{Equation 4:}$$

Equation 4 can be assumed to hold for all values of the state vector, x, within a sufficiently large, but bounded domain of the state space in which the state, $x(t)$, of the system evolves. In some embodiments, W can represent an ideal but unknown vector of weights that can be constant. Moreover, $\beta(x)$ can be a known and bounded vector of one or more basis functions to be selected by a designer. Since $\beta(x)$ can be chosen by a designer, $\beta(x)$ can have a computable Euclidian vector norm bound, $\bar{\beta}$. $\epsilon(x)$ can be the residual error satisfying $|\epsilon(x)|\leq\bar{\epsilon}$ for a sufficiently large, but bounded domain of the state space.

In some embodiments, the purpose of the adaptive control, $u_{ad}(t)$, is to cancel uncertainty in the system. Since both W and $x(t)$ can be unknown, however, it can be necessary to employ estimates for these quantities. Equation 5 represents an adaptive control law that employs estimates for W and $x(t)$ to estimate $\Delta(x(t))$:

$$u_{ad}(t)=\hat{W}^T(t)\beta(\hat{x}(t)) \quad \text{Equation 5:}$$

In some embodiments, as shown in FIG. 1, the state estimate, $\hat{x}(t)$, can be obtained from Equation 3, i.e., as an output of the state observer. The weight estimate, $\hat{W}(t)$, can be obtained by numerical integration of a differential equation that defines the rate of change of the weight estimate with respect to time, as shown in Equation 6:

$$\dot{\hat{W}}(t)=\gamma[\beta(\hat{x}(t))\tilde{y}^T(t)-(\sigma I_s+\beta(\hat{x}(t))\beta(\hat{x}(t))^T/2\mu)\hat{W}(t)] \quad \text{Equation 6:}$$

In Equation 6, γ is the adaptation gain and σ is the sigma-modification gain. In preferred embodiments, γ and σ are positive.

In some embodiments, Equation 6 can define the manner in which $\hat{W}(t)$ is propagated in continuous time. Many controllers, however, are implemented in discrete time, denoted by $t_i$. A preferred implementation of an adaptive control law in discrete time is shown in Equation 7:

$$u_{ad}(t)=\hat{W}^T(t_i)\beta(x(t_i)) \quad \text{Equation 7:}$$

In Equation 7, the weight estimate, $\hat{W}(t_i)$, can be propagated in discrete time using Equation 8 in an iterative fashion:

$$\hat{W}(t_i)=\gamma[\beta(\hat{x}(t_{i-1}))\tilde{y}^T(t_{i-1})-(\sigma I_s+\beta(\hat{x}(t_{i-1}))\beta(\hat{x}(t_{i-1}))^T/2\mu)\hat{W}(t_{i-1})]dt+\hat{W}(t_{i-1}) \quad \text{Equation 8:}$$

where: $dt=t_i-t_{i-1}$

In some embodiments, it can be desirable to ensure that the adaptive control laws of Equations 5 and 7 produce a response that causes the state of the system to remain bounded. It can also be desirable to ensure that the tracking error, $\tilde{y}(t)$, is uniformly ultimately bounded to a sufficiently small error norm. With respect to Equations 7 and 8, it can also be desirable to ensure that the tracking error, $\tilde{y}(t)$, is uniformly ultimately bounded to a sufficiently small error norm for sufficiently small sample time intervals, dt. These goals can be accomplished in embodiments where $\mu>0$ in Equations 6 and/or 8, and Equation 9, i.e., the parameter dependent Riccati equation, has a positive definite solution for P:

$$0=A_e^T P+PA_e+Q_o+\mu NN^T \quad \text{Equation 9:}$$

where: $N=C^T-PB$

In some embodiments, in Equation 9, the matrix $Q_o>0$ and can be freely chosen so long as it is positive definite. In addition, $A_e=A-LC_s$, where L is the state observer gain matrix from Equation 3 and can be known from the existing controller design. μ can be chosen by the designer, and is the "parameter" referred to in the term "parameter dependent Riccati equation," i.e., Equation 9.

In some embodiments, there can be an upper limit for μ for which the parameter dependent Riccati equation can have a positive definite solution for P. This upper limit of μ can be determined by solving Equation 9 for increasing values of μ until P is no longer positive definite. In some embodiments, it can be desirable for a designer to select a value of μ slightly below the maximum value to provide a margin of error that reduces the risk of an unstable system. However, in some embodiments, as μ decreases below the maximum value, stability can improve, but performance (e.g., response time) can decrease. Likewise, as μ approaches the maximum value, performance can improve, but stability can decrease. Therefore, when reducing μ below its maximum value, performance may be traded for improved stability, and vice versa. A designer can therefore experiment with different values of μ to achieve a desired response, i.e., a desired level of performance and stability.

In some embodiments, N=0 corresponds to the situation for which the triple $\{A_e, B, C\}$ is positive real. In this case, μ can be chosen as any positive value. This situation rarely occurs in a practical application, however. Therefore, N≠0 is treated as giving rise to a parameter dependent Riccati equation, such as Equation 9 above, which is based at least in part on μ.

This is in patentable contrast to existing systems that attempt to reduce the size of N. While these systems do not utilize parameter dependent Riccati equations, N affects these systems in other stability-related contexts. Thus, many existing systems attempt to reduce the size of N by altering the matrix $A_e$. Since $A_e = A - LC_s$, and A and $C_s$ are given matrices that cannot be altered, these approaches alter $A_e$ by altering L, the observer gain matrix used in the observer design of Equation 3.

However, approaches that alter L, such as the approach mentioned previously (See E. Lavretsky, "Adaptive Output Feedback Design Using Asymptotic Properties of LQG/LTR controllers," *AIAA Guidance, Navigation, and Control Conference*, Toronto, Canada (2010)), do so by altering the gains of the nominal control design, and therefore do not simply augment that design. These approaches also rely on the use of high gains, and therefore cannot be applied to non-minimum phase systems. Furthermore, even when applied to minimum phase systems, approaches that rely on high gains in the design of the nominal controller amplify sensor noise and increase the potential for unstable responses due to unmodeled high frequency dynamics.

To the contrary, embodiments of the present invention do not necessarily alter the gains of the nominal control design, and can therefore augment the nominal control design without modifying it. The present invention can also avoid the use of high gains, which decreases or avoids the amplification of sensor noise and the potential for unstable responses due to unmodeled high frequency dynamics. The present invention can additionally be applied to both minimum phase and non-minimum phase systems.

Embodiments of the present invention can further comprise a method for adaptive control of an uncertain system. As shown in FIG. 1, the method can comprise providing a control command, u(t), to the uncertain system, causing the uncertain system to react. The control command can comprise a nominal control, $u_n(t)$, and an adaptive control, $u_{ad}(t)$. The method can further comprise the state observer receiving a signal based at least in part on a sensed quantity, $y_s(t)$, from the uncertain system. The state observer can then output a state estimate, $\hat{x}(t)$. The controller can then employ the state estimate in an adaptive control law to calculate a new adaptive control. The adaptive control law can be based at least in part on a weight estimate. As discussed above, the weight estimate, in turn, can be based at least in part on a parameter of a parameter dependent Riccati equation. For certain values of the parameter, as also discussed above, the parameter dependent Riccati equation can have a positive definite solution.

In some embodiments, the method can further comprise providing a new control command to the uncertain system. The new control command can be based at least in part on a new nominal control and a new adaptive control. The new adaptive control can be based at least in part on the adaptive control law.

In some embodiments, a special case can arise when, in Equation 2b, $y_s(t) = x(t)$ or $C_s = I_n$, where $I_n$ is an n×n identity matrix, and n is the number of elements contained in the vector x(t). These embodiments can correspond to cases of state feedback. In some embodiments, the state observer depicted in FIG. 1 may or may not be a part of the existing control system, depending, for example and not limitation, on the level of sensor noise that is present in the system. Where the state observer is not a part of the existing control system, however, the state observer can be replaced, for example, with a reference model that outputs a state estimate or an ideal response. Although the reference model may add to the complexity of the system, as described above, the adaptive control system is nevertheless advantageous because it does not need to modify the gains of the nominal controller and can control non-minimum phase systems. In some embodiments, the equation that defines the reference model can be the same as Equation 3. In some embodiments, however, L=0 in Equation 3, in which case $A_e = A$ in Equation 9. The remainder of the controller and methods of control can function as described above.

EXAMPLES

The derivative-free weight update law of Equation 7 can be illustrated using a model of wing rock dynamics. Wing rock can be a nonlinear phenomenon in which an aircraft exhibits oscillations in roll at high angles of attack. A two-state model for wing rock dynamics can be written in the form given by Equations 10a-10b below, where w(t) represents sensor noise:

$$\begin{bmatrix} \dot{x}_1(t) \\ \dot{x}_2(t) \end{bmatrix} = \begin{bmatrix} 0 & 1 \\ 0 & 0 \end{bmatrix} \begin{bmatrix} x_1(t) \\ x_2(t) \end{bmatrix} + \begin{bmatrix} 0 \\ 1 \end{bmatrix} [u(t) + \Delta(t \cdot x(t))] \quad \text{Equation 10a}$$

$$y_s(t) = \begin{bmatrix} 1 & 0 \end{bmatrix} \begin{bmatrix} x_1(t) \\ x_2(t) \end{bmatrix} + w(t) \quad \text{Equation 10b}$$

The modeling uncertainty of the control system can be represented by Equation 11:

$$\Delta(x(t)) = b_0 + b_1 x_1(t) + b_2 x_2(t) + b_3 |x_1(t)| x_2(t) + b_4 |x_2(t)| x_2(t) + b_5 x_1^3(t) \quad \text{Equation 11:}$$

In this example, constant aerodynamic coefficients are chosen as $b_0 = 0$, $b_1 = -0.0186$, $b_2 = 0.0152$, $b_3 = 0.6245$, $b_4 = -0.0095$, and $b_5 = 0.0215$. In Equations 10a-10b and 11, $x_1(t)$ represents the roll angle, and $x_2(t)$ represents the roll rate. The existing controller gains are $K_x$ and $K_r$. The existing state observer gain is L. A bias term and five sigmoidal basis functions are used in the adaptive control design. Thus, $\beta_1(x) = 1$, and $$\beta_i(\hat{x}) = \frac{1 - e^{-a\phi_i(\hat{x})}}{1 + e^{-a\phi_i(\hat{x})}},$$

i=2, . . . , 6, and the activational potential a=3 and $\phi_i(\hat{x})$ are normalized basis functions defined in Equation 12:

$$\phi_2(\hat{x}) = \phi_n, \phi_3(\hat{x}) = \dot{\phi}_n, \phi_4(\hat{x}) = \phi_n^2, \phi_5(\hat{x}) = \dot{\phi}_n^2, \phi_6(\hat{x}) = \phi_n \dot{\phi}_n \quad \text{Equation 12:}$$

where: $\phi_n = \hat{x}_1/\pi$ and $\dot{\phi}_n = \hat{x}_2/\pi$

Augmentation of a Proportional Nominal Controller

This example illustrates a typical result achieved when augmenting a nominal control design based on proportional control. The reference model is second order with a natural frequency of 1.5 rad/sec and a damping ratio of 0.707. This amounts to choosing $K_x$=[2.25 2.121] and $K_r$=2.25. The observer gain is $L^T$=[7.07 25]. Several simulation results are given in FIGS. 2-5. The results were generated using γ=100 and σ=0.01. Using $Q_0 = I_2$ in Equation 9, where $I_2$ is a 2×2 identity matrix, it was determined that the upper limit for μ such that P is positive definite is μ=23.8. To provide a margin of error, μ was therefore chosen to be μ=23.7. The responses are all for randomly chosen initial conditions [$x_1, x_2$]=[6° 3°/s].

Figure 2:
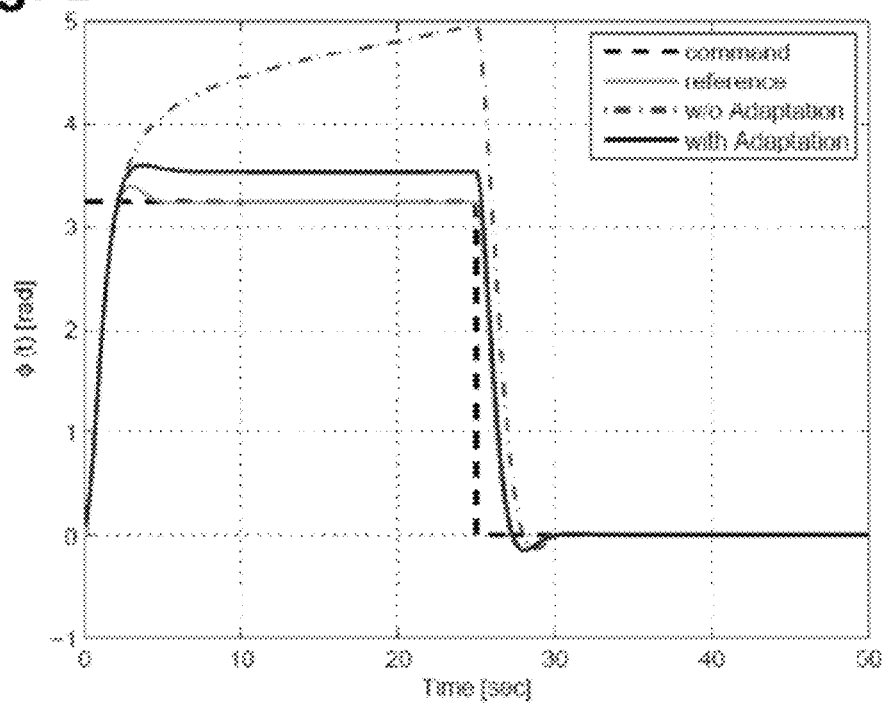
FIG. 2 is a graph showing a step response using a proportional nominal controller with and without adaptation, in accordance with some embodiments of the present invention.

FIG. 2 shows a typical step response. The system is unstable without adaptation, but it tracks the reference response well with adaptation. There is a significant steady state error, however.

Figure 3:
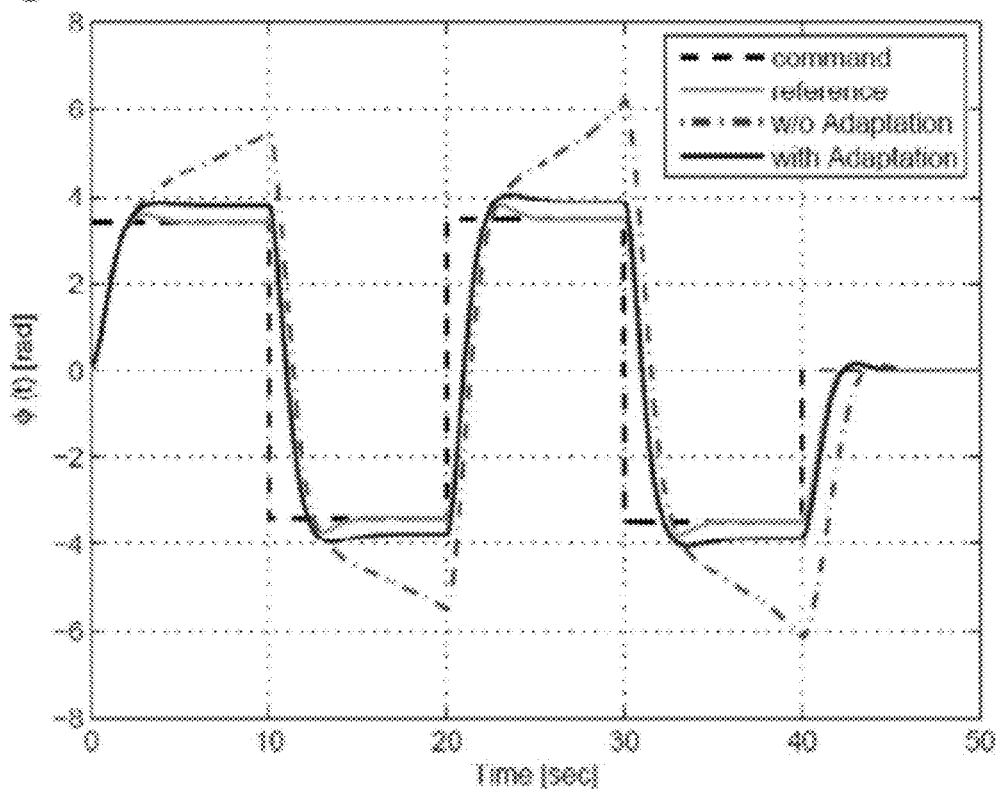
FIG. 3 is a graph showing a tracking response for a sequence of pulse commands with and without adaptation, in accordance with some embodiments of the present invention.
Figure 4:
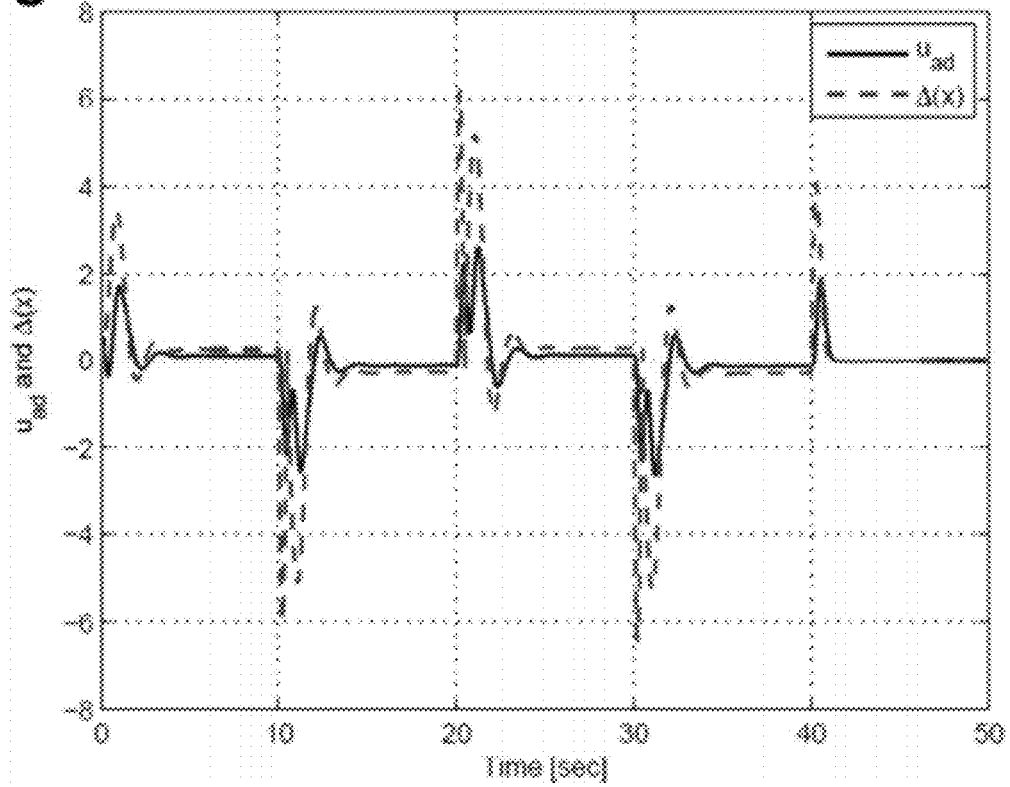
FIG. 4 is a graph showing the adaptive control and uncertainty in the response of FIG. 3, in accordance with some embodiments of the present invention.
Figure 5:
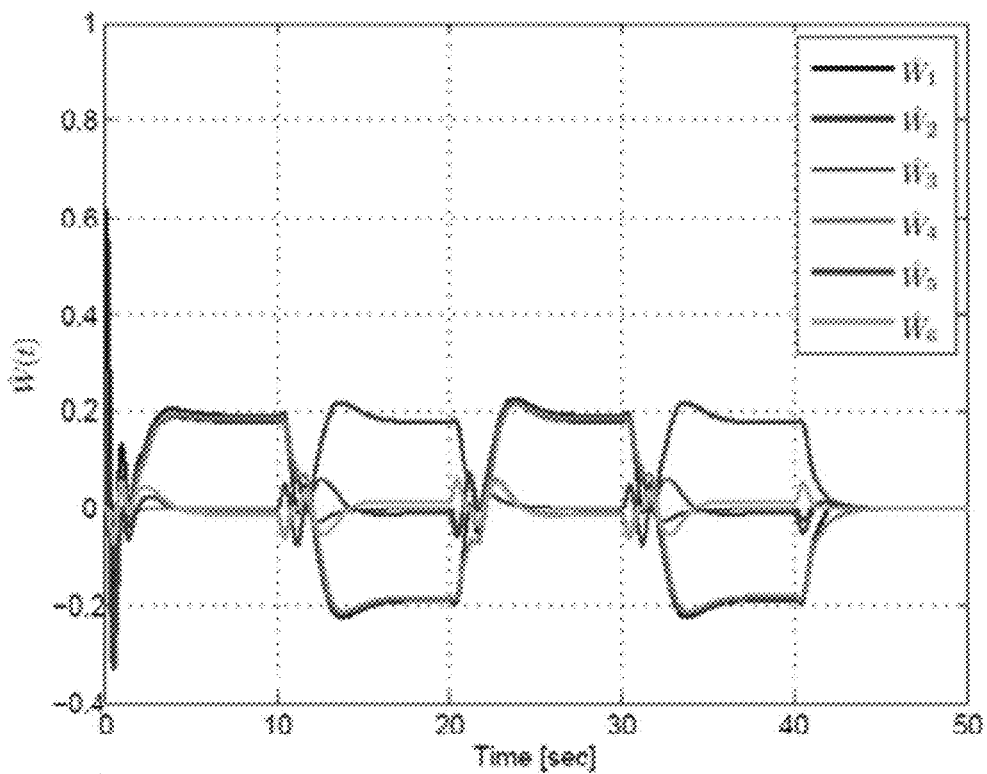
FIG. 5 is a graph showing the estimated weights in the response of FIG. 3, in accordance with some embodiments of the present invention.

FIG. 3 shows a response for a sequence of pulse commands. FIG. 4 shows the comparison between $u_{ad}(t)$ and $\Delta(x(t))$ with adaptation, and FIG. 5 shows the corresponding weight histories.

Augmentation of a PI Nominal Controller

The results described and shown above, i.e., in FIGS. 2-5, highlight that the adaptive controller cannot always be relied on to provide zero steady state error. Thus, if zero steady state error is required, this requirement should be reflected in the design of the nominal control as a proportional plus integral ("PI") regulator.

In this example, linear quadratic regulator theory is used for the design by adding a third state variable to the dynamics. The third state variable represents the integral of $r(t)-x_1(t)$. The new state therefore becomes [$x_1(t), x_2(t), \int r(t)-x_1(t)$] and the corresponding dynamics are shown in Equations 13a-13b:

$$\begin{bmatrix} \dot{x}_1(t) \\ \dot{x}_2(t) \\ \dot{x}_3(t) \end{bmatrix} = \begin{bmatrix} 0 & 1 & 0 \\ 0 & 0 & 0 \\ -1 & 0 & 0 \end{bmatrix} \begin{bmatrix} x_1(t) \\ x_2(t) \\ x_3(t) \end{bmatrix} + \quad \text{Equation 13a}$$

$$\begin{bmatrix} 0 \\ 1 \\ 0 \end{bmatrix} [u(t) + \Delta(x(t))] + \begin{bmatrix} 0 \\ 0 \\ 1 \end{bmatrix} r(t)$$

$$y_s(t) = [1 \ 0 \ 0] \begin{bmatrix} x_1(t) \\ x_2(t) \\ x_3(t) \end{bmatrix} \quad \text{Equation 13b}$$

The feedback gain matrix in the nominal controller is a linear quadratic regulator. The weighting matrices in the design were chosen as Q=diag[20, 3, 1] and R=0.5. This leads to $K_x$=[7.2675, 4.5316, −1.4142] as PI feedback gain and $K_r$=7.2675 as the PI feedforward gain.

Figure 6:
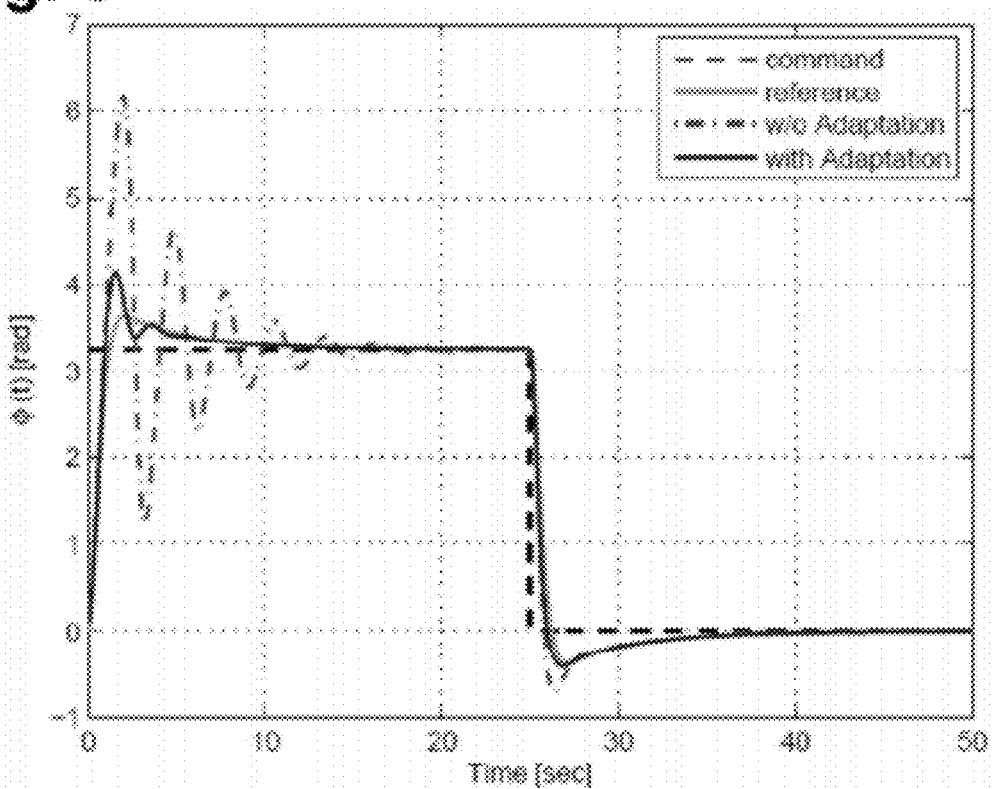
FIG. 6 is a graph showing a step response with and without adaptation using a proportional plus integral nominal controller, in accordance with some embodiments of the present invention.

FIG. 6 shows step responses for the case of PI nominal control design. The responses were generated using the same adaptation gain and initial conditions used above, with μ=71.

As can be seen in FIG. 6, the system shows significant oscillation without adaptation, but it tracks the reference response well with adaptation. Moreover, the steady state error is reduced to zero.

While several possible embodiments are disclosed above and throughout this specification, embodiments of the present invention are not so limited. For instance, while several possible control systems, methods, and adaptive control laws have been provided, other suitable methods, equations, configurations, or combinations could be selected without departing from the spirit of embodiments of the invention. In addition, the configuration used for various features of embodiments of the present invention can be varied according to the particular requirements of a plant or control system. Such changes are intended to be embraced within the scope of the invention.

The specific methods, method steps, systems, and other embodiments disclosed can be varied according to particular needs. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. An adaptive control system for controlling a plant, the adaptive control system comprising:
   a state observer configured to receive a sensed quantity from the plant, the state observer further configured to output a state estimate based at least in part on the sensed quantity; and
   a controller configured to receive the state estimate and employ the state estimate in an adaptive control law to calculate an adaptive control, the adaptive control law based at least in part on a weight estimate, the controller further configured to produce a control command that is an input to the plant;
   wherein at least a component of the control command is the adaptive control; and
   wherein the weight estimate is based at least in part on a parameter of a parameter dependent Riccati equation, the value of the parameter being selectable, and the parameter dependent Riccati equation having a positive definite solution for the selected value of the parameter.

2. The adaptive control system of claim 1, wherein there is a maximum value of the parameter of the parameter dependent Riccati equation for which the parameter dependent Riccati equation has a positive definite solution.

3. The adaptive control system of claim 1, wherein the state of the plant remains bounded when the value of the parameter of the parameter dependent Riccati equation is greater than zero.

4. The adaptive control system of claim 3, wherein the plant comprises a non-minimum phase system.

5. The adaptive control system of claim 1, wherein the parameter dependent Riccati equation is based at least in part on a state observer gain matrix.

6. The adaptive control system of claim 1, wherein the adaptive control system does not comprise a reference model.

7. The adaptive control system of claim 1, wherein the adaptive control law is based at least in part on a vector of basis functions.

8. The adaptive control system of claim 1,
   wherein the control command further comprises a nominal control from a control system of the plant, the nominal control comprising a gain;

wherein the adaptive control augments the nominal control; and wherein the gain of the nominal control is not modified to accommodate the adaptive control.

9. A method for adaptive control of an uncertain system, the method comprising:
providing a first control command as an input to the uncertain system, the first control command based at least in part on a first adaptive control;
receiving a signal by a state observer, the signal based at least in part on a sensed quantity from the uncertain system;
outputting a state estimate from the state observer;
employing the state estimate in an adaptive control law to calculate a second adaptive control, the adaptive control law based at least in part on a weight estimate; and
providing a second control command as an input to the uncertain system, the second control command based at least in part on the second adaptive control;
wherein the weight estimate is based at least in part on a parameter of a parameter dependent Riccati equation, the value of the parameter being selectable, and the parameter dependent Riccati equation having a positive definite solution for the selected value of the parameter.

10. The method for adaptive control of claim 9 further comprising bounding the state of the system.

11. The method for adaptive control of claim 9, wherein the uncertain system comprises a non-minimum phase system.

12. The method for adaptive control of claim 9, wherein a reference model is not used to define an ideal response of the uncertain system.

13. The method for adaptive control of claim 9, wherein the weight estimate is a function of continuous time.

14. The method for adaptive control of claim 9, wherein the weight estimate is a function of discrete time.

15. The method for adaptive control of claim 9,
wherein the second control command comprises the second adaptive control added to a nominal control,
wherein the nominal control comprises a gain; and
wherein the gain of the nominal control is not modified to accommodate the adaptive control.

16. An adaptive control system for controlling an uncertain system, the adaptive control system comprising:
a reference model configured to output a state estimate; and
a controller configured to receive the state estimate and employ the state estimate in an adaptive control law to calculate an adaptive control, the adaptive control law based at least in part on a weight estimate, the controller further configured to produce a control command that is an input to the uncertain system;
wherein at least a component of the control command is the adaptive control; and
wherein the weight estimate is based at least in part on a parameter of a parameter dependent Riccati equation, the parameter being selected from a set of values that generate a positive definite solution for the parameter dependent Riccati equation.

17. The adaptive control system of claim 16, wherein the state of the uncertain system remains bounded when the value of the parameter of the parameter dependent Riccati equation is greater than zero.

* * * * *